(12) United States Patent
Poe et al.

(10) Patent No.: US 11,477,695 B2
(45) Date of Patent: Oct. 18, 2022

(54) NETWORK FUNCTION FOR END-TO-END COMMUNICATION SERVICES

(71) Applicant: HUAWEI TECHNOLOGIES CO., LTD., Guangdong (CN)

(72) Inventors: Wint Yi Poe, Munich (DE); Ishan Vaishnavi, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/011,405

(22) Filed: Sep. 3, 2020

(65) Prior Publication Data

US 2020/0404539 A1   Dec. 24, 2020

Related U.S. Application Data

(63) Continuation of application No. PCT/EP2018/055838, filed on Mar. 8, 2018.

(51) Int. Cl.
*H04W 28/08* (2009.01)

(52) U.S. Cl.
CPC .................... *H04W 28/09* (2020.05)

(58) Field of Classification Search
None
See application file for complete search history.

(56) References Cited

U.S. PATENT DOCUMENTS

| 2010/0329150 A1* | 12/2010 | Nielsen | H04W 24/02 370/254 |
| 2014/0227992 A1* | 8/2014 | Bader | H04W 24/08 455/405 |

(Continued)

FOREIGN PATENT DOCUMENTS

| CN | 106332176 A | 1/2017 |
| CN | 107113195 A | 8/2017 |
| WO | 2019020171 A1 | 1/2019 |

OTHER PUBLICATIONS

Yannuzzi M et al: Bridging the interoperability gap between the Internet and optical network management systems Networks and Optical Communications(NOC) 2011 16th European Conference on IEEE Jul. 20, 2011 pp. 177-180, XP032039793 4 pages.

(Continued)

*Primary Examiner* — Kenny S Lin
(74) *Attorney, Agent, or Firm* — WHDA, LLP

(57) ABSTRACT

The disclosure relates to a network function for supporting end-to-end communication services in a communication network, wherein the communication network comprises a first management system for managing a 3GPP 5G subnetwork and a second management system for managing a 3GPP legacy subnetwork and/or a non-3GPP subnetwork. The network function provides an interface between the first management system and the second management system. The first management system and/or the second management system comprises a plurality of network management functions and/or network management function instances. The network function also selects one or more of the plurality of network management functions and or network management function instances in response to a service request on the basis of a load balancing requirement, a minimum latency requirement defined by the service request and/or a quality of a service requirement defined by the service request.

16 Claims, 14 Drawing Sheets

(56) References Cited

U.S. PATENT DOCUMENTS

| | | | | |
|---|---|---|---|---|
| 2016/0353422 | A1* | 12/2016 | Vrzic | H04W 16/04 |
| 2016/0353465 | A1* | 12/2016 | Vrzic | H04W 28/0247 |
| 2016/0359682 | A1* | 12/2016 | Senarath | H04W 16/14 |
| 2017/0086049 | A1* | 3/2017 | Vrzic | H04W 40/00 |
| 2017/0086118 | A1* | 3/2017 | Vrzic | H04W 36/26 |
| 2017/0289791 | A1* | 10/2017 | Yoo | H04W 68/005 |
| 2018/0192471 | A1* | 7/2018 | Li | H04W 4/60 |
| 2018/0220276 | A1* | 8/2018 | Senarath | H04L 12/1403 |
| 2019/0149425 | A1* | 5/2019 | Larish | G06N 3/006 706/16 |
| 2019/0150150 | A1* | 5/2019 | Calin | H04L 43/026 370/329 |
| 2019/0349272 | A1* | 11/2019 | Chou | H04L 43/0817 |
| 2020/0382386 | A1* | 12/2020 | Narendra | H04L 41/0893 |

OTHER PUBLICATIONS

Wei Chen China Mobile China: Draft output of Recommendation ITU-T Y.NSOM mobile network slicing; TD123/WP1 ITU-T Draft; Study Period 2017-2020; Study Group 13;Series TD123/WP1 International Telecommunication Union Geneua;CH, vol. 21/ 13, Nov. 14, 2017, XP044209841, pp. 1-13.

Huawei, Clarification on TN coordination in clause 5.1.1. 3GPP TSG SA WG5 (Telecom Management) Meeting #117 Jan. 29-Feb. 2, 2018, Rome, Italy, S5-181162, 8 pages.

3GPP TR 28.801 V15.1.0 (Jan. 2018), 3rd Generation Partnership Project;Technical Specification Group Services and System Aspects;Telecommunication management;Study on management and orchestration of network slicing for next generation network (Release 15), 75 pages.

3GPP TS 28.530 V0.5.0 (Feb. 2018), 3rd Generation Partnership Project;Technical Specification Group Services and System Aspects;Telecommunication management;Management of 5G networks and network slicing;Concepts, use cases and requirements (Release 15), 28 pages.

3GPP TS 32.101 V15.0.0 (Sep. 2017), 3rd Generation Partnership Project;Technical Specification Group Services and System Aspects;Telecommunication management;Principles and high level requirements(Release 15), 68 pages.

3GPP TS 28.530 V0.4.0 (Dec. 2017), 3rd Generation Partnership Project;Technical Specification Group Services and System Aspects;Telecommunication management; Management of 5G networks and network slicing; Concepts, use cases and requirements (Release 15), 27 pages.

3GPP TS 23.501 V15.0.0 (Dec. 2017), 3rd Generation Partnership Project;Technical Specification Group Services and System Aspects; System Architecture for the 5G System;Stage 2(Release 15), 181 pages.

International Search Report dated Nov. 2, 2018, issued in counterpart Application No. PCT/EP2018/055838 (15 pages).

Office Action dated Mar. 26, 2021, issued in counterpart CN Application No. 201880090154.0 (10 pages).

Office Action dated Dec. 17, 2021, issued in counterpart CN application No. 201880090154.0. (4 pages).

3GPP TR 28.801 V0.3.0 (Nov. 2016), 3rd Generation Partnership Project; Technical Specification Group Services and System Aspects; Telecommunication management; Study on management and orchestration of network slicing for next generation network (Release 14), 24 pages.

Office Action dated Mar. 23, 2022, issued in counterpart EP Application No. 18711271.9. (6 pages).

* cited by examiner

NETWORK FUNCTION FOR END-TO-END COMMUNICATION SERVICES

CROSS-REFERENCE TO RELATED APPLICATIONS

This application is a continuation of International Application No. PCT/EP2018/055838, filed on Mar. 8, 2018, the disclosure of which is hereby incorporated by reference in its entirety.

TECHNICAL FIELD

In general, the present disclosure relates to communication networks. More specifically, the present disclosure relates to a network function for a communication network comprising a first management system and a second management system for providing end-to-end communication services.

BACKGROUND

Network slicing is expected to be one of the key features in the 5th Generation (5G) mobile technology and will be deployed by 2020. Network slicing enables 5G mobile telecommunication system to integrate vertical industries by providing a service-tailored network function provisioning scheme.

According to 3GPP IS 28.530 v0.4.0, "Management of network slicing in mobile networks: Concepts, use cases and requirements", Network Slice as a Service (NSaaS) can be offered by a communication service provider to its communication service customer in the form of a communication service. Together with network slicing, the concept of service-based architecture (SBA) becomes more and more important in management functions defined in 3GPP SA5 (see 3GPP TR 28.801 v15.1.0, "Study on management and orchestration of network slicing for next generation network" and 3GPP TS 28.530 v0.4.0, "Management of network slicing in mobile networks: Concepts, use cases and requirements").

A network slicing management architecture 100 for 3GPP 5G system is shown in FIG. 1, which consists of management functions defined by 3GPP SA5 (see 3GPP TR 28.801 v15.1.0). While a Communication Service Management Function (CSMF) 101 is responsible for communication services, a Network Slice Management Function (NSMF) 103 is responsible for management and orchestration of Network Slice Instances (NSIs). A Network Slice Subnet Management Function (NSSMF) 105 is responsible for management and orchestration of Network Slice Subnet Instances (NSSIs).

On the other hand, FIG. 2 presents a conventional (3GPP Legacy) management system 200 which consists of Network Manager (NM) 201, Domain Manager (DM) 203 and Element Manager (TM) 205, as can be found in 3GPP TS 32.101 v1.1.0, "Telecommunication management; principles and high level requirements". The Network Manager (NM) 201 provides a set of end-user functions with the responsibility for the management of a network, mainly supported by the Element Manager (EM) 205, but it may also involve direct access to the network elements managed by the Element Manager (EM) 205. The Domain Manager (DM) 203 provides element management functions and domain management functions for a subnetwork as well as multiple vendor and multiple technology network management functions. The Element Manager (EM) 205 provides a set of end-user functions for management of a set of closely related types of network elements.

As can be seen in more details from the above reference, a 3GPP management system receives a communication service with and/or without network slicing from the communication service customer. The 3GPP 5G management system receives the requirements related to the communication service if the service is a 5G service, and the 3GPP 5G management system manages the 5G services provided by the Network Operator using appropriated management functions CSMF, NSMF, NSSMF. The 3GPP 5G management system, for example, CSMF, should forward the network-related requirements to the conventional management system if the service includes a 3G/4G service, wherein the conventional management system manages the 3GAG services provided by the network operator using appropriated management systems (e.g., NM, DM, EM). In 3GPP 5G management functions, the interaction with legacy systems should be supported, in particular, in order to reduce capital expenditure.

In 3GPP TR 28.801 v15.1.0, "Study on management and orchestration of network slicing for next generation network", multiple-operator coordination for the network slice management becomes a use case and, thus, an end-to-end network slice instance can be created across multiple operators, as presented in FIG. 3.

FIG. 3 illustrates a network slice instance (NSI) 301 comprising two network slice subnet instances, NSSI-A1 303 and NSSI-B1 305, which belong to an operator A 307 and an operator B 309 respectively. Each NSSI represents a collection of specific (logical) network functions (NFs) 311a-f, links and resources to form a logical network.

The concept of service-based architecture (SBA) becomes more and more important in 5G management architecture as shown in FIG. 1. In other words, the management function modularization will be a key issue in the future. The main concept of management function modularization is to be independent, interchangeable, and flexible management function modules which are virtualized and able to distribute and serve in multiple geographical locations (e.g., edge clouds) in order to obtain high efficiency in end-to-end communication service management. The modularization can be considered at a particular function level, at a set of particular functions level, or even at the entire management system level.

In each level of SBA modularization, there exist multiple instances and modules. For example, a modularized NSMF can be composed of different modules of particular functions such as performance management (PM) and fault management (FM). Another example is multiple instances of a modularized 5G management system. Such multiple modularized instances which may or may not consist of multiple modules can be distributed and served from multiple locations.

However, coordination is required between different instances as well as modules of 5G modularized management functions and/or systems. Moreover, an important aspect is that the interaction or communication with 3GPP legacy systems is needed in order to reduce the cost for investments of upgrading to the new Generation mobile technologies (e.g., 5G system). The 3GPP legacy systems include but are not limited to 2G/3G/4G management systems.

Additionally, modularized 5G management systems require the interaction or communication with non-3GPP management systems to provide an end-to-end communication service or network slicing.

In light of the above, there is a need for a network function for a communication network comprising a 3GPP 5G subnetwork and a 3GPP legacy subnetwork and/or to non-3GPP subnetwork, allowing fore supporting end-to-end communication services in the communication network.

SUMMARY

It is an object of the disclosure to provide a network function for a communication network comprising a 3GPP 5G subnetwork and a 3GPP legacy subnetwork and/or a non-3GPP subnetwork, allowing for supposing end-to-end communication services with and/or without network slices in the communication network.

The foregoing and other objects are achieved by the subject matter of the independent claims. Further implementation forms are apparent from the dependent claims, the description and the figures.

Generally, embodiments of the disclosure relate to service-based architecture (SBA) modularization in a 3GPP 5G management system. More specifically, embodiments of the disclosure can use a network function for supporting end-to-end communication services with and/or without network slices in a communication network, wherein the communication network comprising a first management system for managing a 3GPP 5G subnetwork and a second management system for managing a 3GPP legacy subnetwork and/or a non-3GPP subnetwork.

Thus, embodiments of the disclosure can enable a modularized 3GPP SG management system to interact and coordinate with a 3GPP legacy system as well as a non-3GPP management system. In particular, the network function according to the embodiments can be a part of any 5G modular management function anti or system instance and provide abstraction and forwarding functionalities to a legacy system or a non-3GPP system while selection and forwarding functionalities are supported in between 3GPP 5G modular management function and/or system instances.

More specifically, according to a first aspect, the disclosure relates to a network function (herein referred to as an Abstraction and Forwarding Function, AFF) for supporting end-to-end communication services with and/or without network slices in a communication network, wherein the communication network comprises a first management system for managing a 3GPP 5G subnetwork of the communication network and a second management system for managing a 3GPP legacy subnetwork and/or a non-3GPP subnetwork of the communication network, wherein the network function is configured to provide an interface between the first management system and the second management system, wherein the first management system and/or the second management system comprises a plurality of network management functions and/or network management function instances and wherein the network function is configured to select one or more of the plurality of network management functions and/or network management function instances in response to a service request on the basis of a load balancing requirement, a minimum latency requirement defined by the service request and/or a quality of service requirement defined by the service request.

Thus, an improved network entity for supporting end-to-end communication services is provided, allowing communication between modularized 3GPP 5G management systems and 3GPP legacy systems as well as non-3GPP systems.

In a further possible implementation form of the first aspect, the network function is further configured to provide an interface between the plurality of network management functions and/or network management function instances of the first management system and/or between the plurality of network management functions and/or network management auction instances of the second management system.

In a further possible implementation form of the first aspect, the network function is configured to forward the service requirements and/or request to the selected network management functions and/or network management function instances. For example, a NSMF instance may forward the network slice subnet related requirements to the selected NSSMF instance in NSI creation by using the forwarding functionalities of the network function. Another example is that a CSMF instance may forward the network slice related request to the selected NSMF instance in NSI termination by using the network function.

In a further possible implementation form of the first aspect, the network function is configured to generate local identifiers for the one network management function and/or network. management function instance and the selected network management functions and/or network management function instances and the local identifier is used to store the mapping of management function instances, for example, NSW to NSSMF(s) with the corresponding identifiers of managed entities NSI and NSSI(s), respectively, into a local mapping database. The network function is further configured to update the local mapping database, for example, the network function co-located with the NSMF instance deletes the corresponding mapping information of a specific NSI to NSSI(s) together with NSMF and NSSMF instance(s) information upon receiving a successful response from the selected NSSMF instance(s) for the NSSI(s) of the NSI for the NSI termination.

In a further possible implementation form of the first aspect, the network function is further configured to maintain a repository of information about the plurality of network management functions and/or network management function instances and to update the repository upon receiving the request horn other network management functions and/or network management function instances.

According to a second aspect, the disclosure relates to a communication network for providing end-to-end communication services, including communication services with network slices and communication services without network slices, wherein the communication network comprises: a first management system for managing a 3GPP 5G subnetwork of the communication network; a second management system for managing a 3GPP legacy subnetwork and/or a non-3GPP subnetwork of the communication network; and at least one network function according to any possible implementation form of the first aspect.

Thus, an improved communication network for supporting end-to-end communication services is provided, allowing communication between modularized 3GPP 5G management systems and 3GPP legacy systems as well as non-3GPP systems.

In a further possible implementation form of the second aspect, the first management system comprises a plurality of network management functions and/or network management function instances, including one or more instances of a communication service management function, CSMF, one or more instances of a network slice management function, NSMF, and/or one or more instances of a network slice subnet management function, NSSMF.

In a further possible implementation form of the second aspect, the network function is implemented as part of one network management function and/or network management function instance of the plurality of network management functions and/or network management function instances of the first management system.

In a further possible implementation form of the second aspect, the one network management function and/or network management function instance comprises a local mapping database for storing local identifiers of the one network management function and/or network management function instance and the selected network management functions and/or network management function instances generated by the network function together with the identifiers of the managed entities.

In a further possible implementation form of the second aspect, the one network management function and/or network management function instance comprises a repository of information about the plurality of network management functions and/or network management function instances.

In a further possible implementation form of the second aspect, the communication network comprises a plurality of instances of the first management system.

In a further possible implementation form of the second aspect, the second management system is configured to manage a 3GPP legacy subnetwork of the communication network and wherein the second management system comprises a network manager, NM, a domain manager, DM, and/or an element manager, EM.

According to a third aspect the disclosure relates to a method for supporting end-to-end communication services in a communication network, including communication services with network slices and communication services without network slices, wherein the communication network comprises a first management system for managing a 3GPP 5G subnetwork of the communication network and a second management system for managing a 3GPP legacy subnetwork and/or a non-3GPP subnetwork of the communication network.

The method comprises the steps of: providing a network function, wherein the network function is configured to provide an interface between the first management system and the second management system, wherein the first management system and/or the second management system comprises a plurality of network management functions and/or network management function instances; and selecting one or more of the plurality of network management functions and/or network management function instances by the network function in response to a service request on the basis of a load balancing requirement, a minimum latency requirement defined by the service request and/or a quality of service requirement defined by the service request.

Thus, an improved method is provided, allowing communication between modularized 3GPP 5G management systems and 3GPP legacy systems as well as non-3GPP systems.

According to a fourth aspect the disclosure relates to a computer program comprising program code for performing the method of the third aspect when executed on a computer.

The disclosure can be implemented in hardware and/or software.

BRIEF DESCRIPTION OF THE DRAWINGS

Further embodiments of the disclosure will be described with respect to the following figures, wherein.

Figure 1:
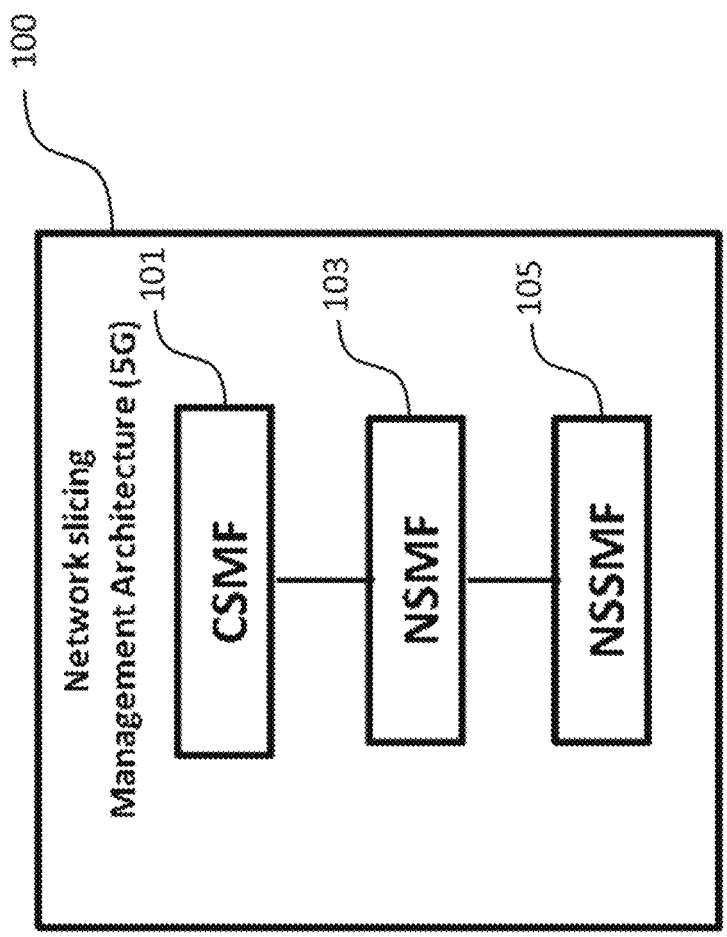
FIG. 1 shows a schematic diagram illustrating the architecture of a 3GPP 5G network slicing management.
Figure 2:
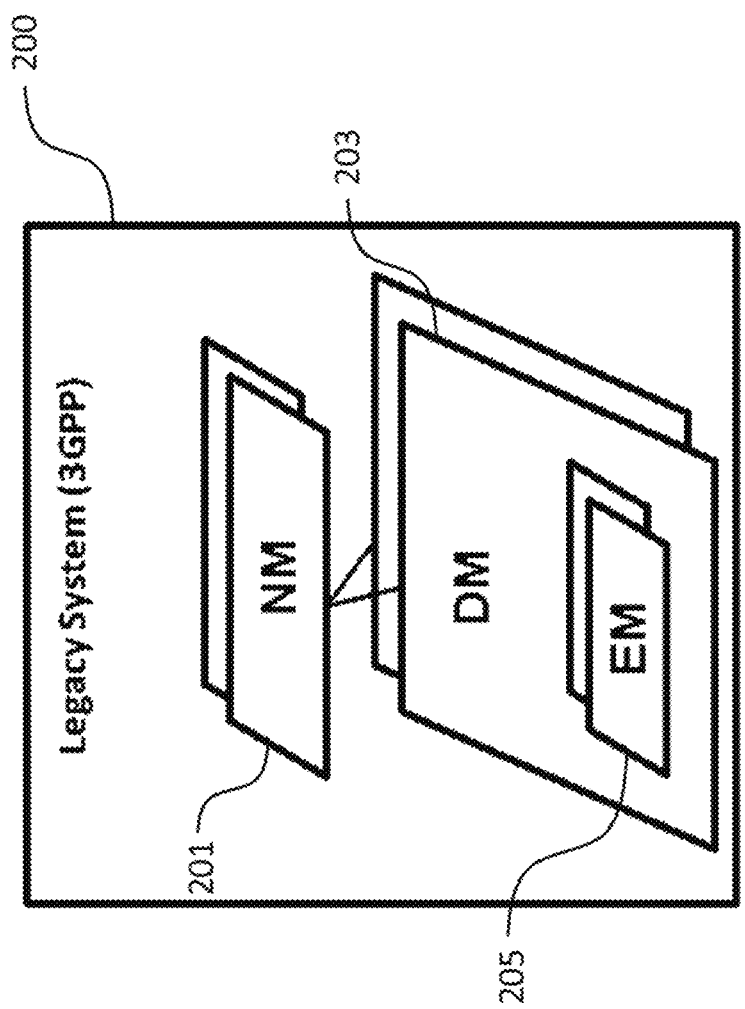
FIG. 2 shows a schematic diagram illustrating the architecture of a 3GPP legacy management system.
Figure 3:
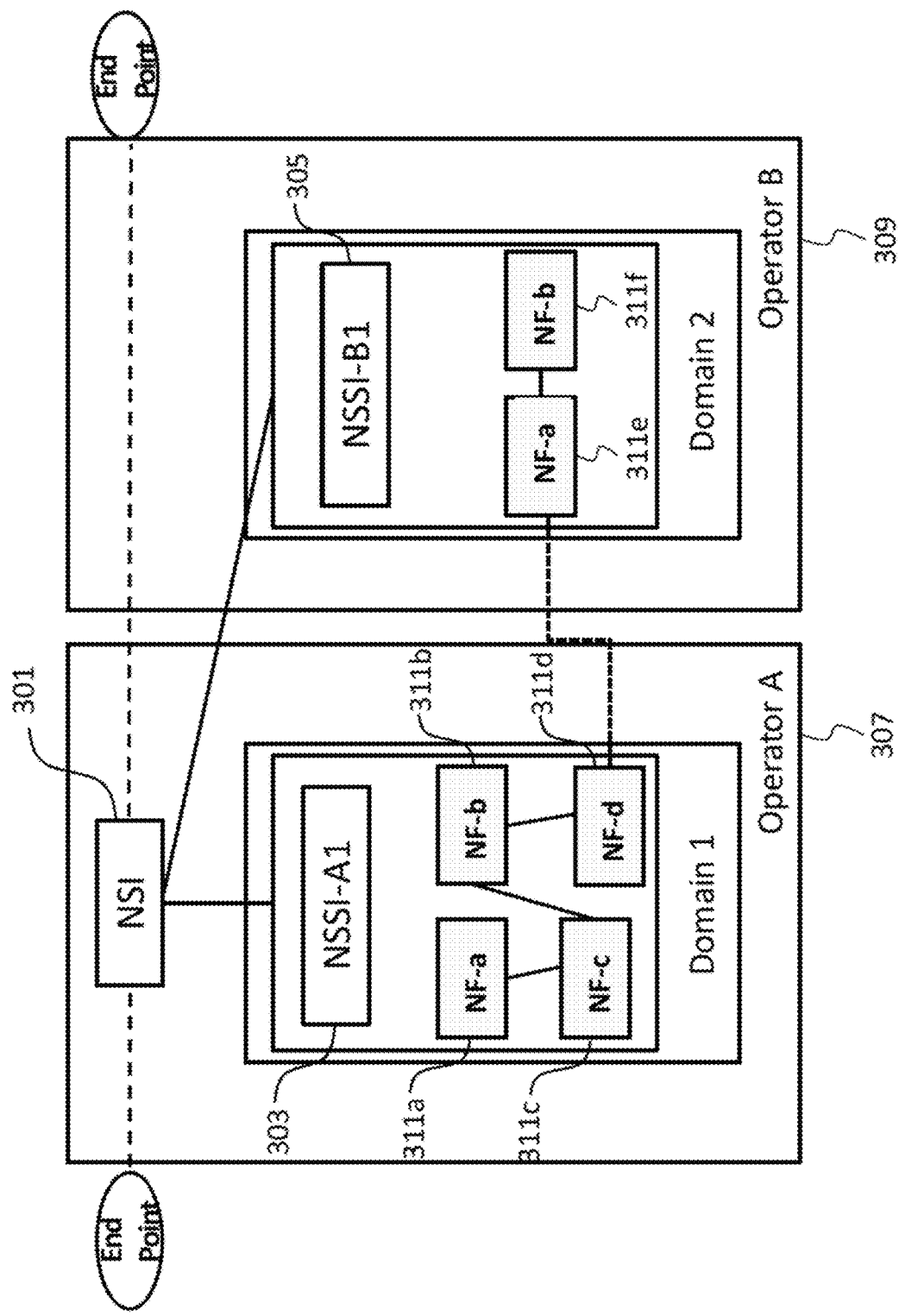
FIG. 3 shows a schematic diagram illustrating the architecture of a communication network with a network slice instance deployed across multiple operator networks.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present disclosure may be placed. It will be appreciated that other aspects may be utilized and structural or logical changes may be made without departing from the scope of the present disclosure. The following detailed description, therefore, is not to be taken in a limiting sense, as the scope of the present disclosure is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

The following disclosure employs a plurality of terms which, in embodiments, have the following meaning: NSI—a network slice instance that is an instance of a specific network slice which provides a complete network slice features. NSSI—a subnet instance of NSI that does not provide a complete network slice features. NF—a network function that can have either a physical or logical properties. CSMF—a Communication Service Management Function that is responsible for translating the communication service related requirement to network slice related requirements and communicates with NSMF. NSMF—a Network Slice Management Function that is responsible for management and orchestration of NSI and derives network slice subnet related requirements from network slice related requirements and communicates with NSSMF and CSMF. NSSMF—a Network Slice Subnet Management Function that is responsible for management and orchestration of NSSI and communicates with the NSMF. NSaaS—a Network Slice as a Service that can be offered by a Communication Service Provider (CSP) to its Communication Service Customer (CSC), wherein both CSP and CSC can be a Network operator (NOP). Legacy system—a legacy system that is a generic name assigned to any old method, technology, or management systems relating to the previous generations of 3GPP mobile telecommunication systems. Non-3GPP systems technologies and systems that are not specified by the 3GPP, including technologies such as WiFi, TN, ETSI MANO, etc.

As will be described in more detail in the following, embodiments of the disclosure enable modularization of a 5G management system defined by the 3rd Generation Partnership Project (3GPP) for end-to-end communication services (including network slicing) by using a network function, in particular, for abstraction and forwarding function.

Figure 4:
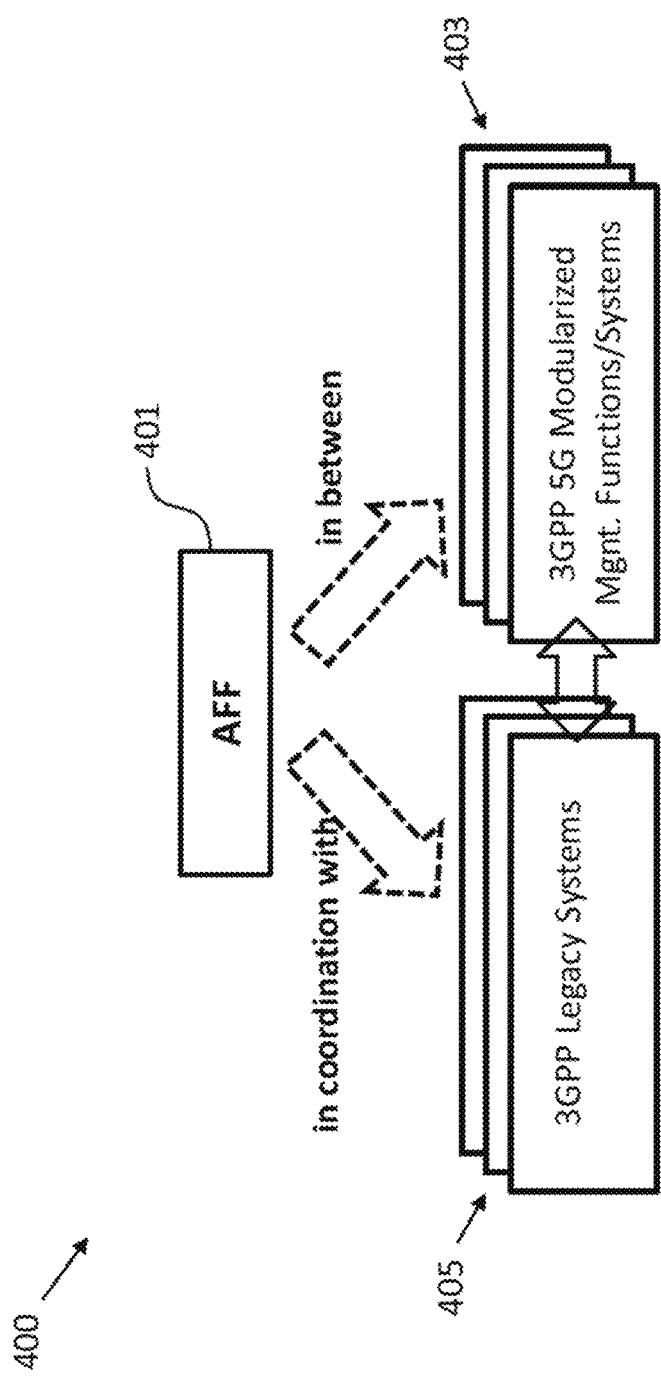
FIG. 4 shows a schematic diagram illustrating a communication network comprising a network function according to an embodiment as well as a first management system and a second management system according to an embodiment.

Embodiments of the disclosure can be implemented in a communication network 400, which has a general architecture as shown in FIG. 4. According to au embodiment, FIG. 4 shows a schematic diagram illustrating a communication network 400 for providing end-to-end communication services, including communication services with network slices and communication services without network slices, wherein the communication network 400 comprises and a network function 401, a first management system 403 for managing a 3GPP 5G subnetwork of the communication network 400, and a second management system 405 for managing a 3GPP legacy subnetwork and/or a non-3GPP subnetwork of the communication network 400.

The multiple instances of a modular management function or system requires forwarding functionalities to communicate with different instances or modules of other management functions. In addition, the abstraction functionalities are required if communication with a 3GPP legacy system is required. This abstraction feature enables a 5G management system to reuse a 3GPP legacy system when managing 5G communication services/slices considering the requirements of the end-to-end communication service slice are satisfied. Additionally, this forwarding and abstraction functionalities can also be applied for the communication with non-3GPP systems.

Thus, the embodiments can use the network function 401, in particular, a modular abstraction and forwarding function (hereafter also referred to as AFF) for a 5G modularized management system to support end-to-end communication services (including network slices) in coordination with the first management system 403 for managing a 3GPP 5G subnetwork and the second management system 405 for managing the 3GPP legacy subnetwork as illustrated in FIG. 4.

More specifically, the network function 401 is configured to provide an interface between t first management system 403 and the second management system 405.

Furthermore, the first management system 403 and/or the second management system 405 comprises a plurality of network management functions and/or network management function instances, which will be discussed in more details under reference to FIG. 5. And the network function 401 is configured to select one or more of the plurality of network management functions and/or network management function instances in response to a service request on the basis of a load balancing requirement, a minimum latency requirement defined by the service request and/or a quality of service requirement defined by the service request. After the selection, the network function 401 is then configured to forward the service request to the selected network management functions and/or network management function instances.

Figure 5:
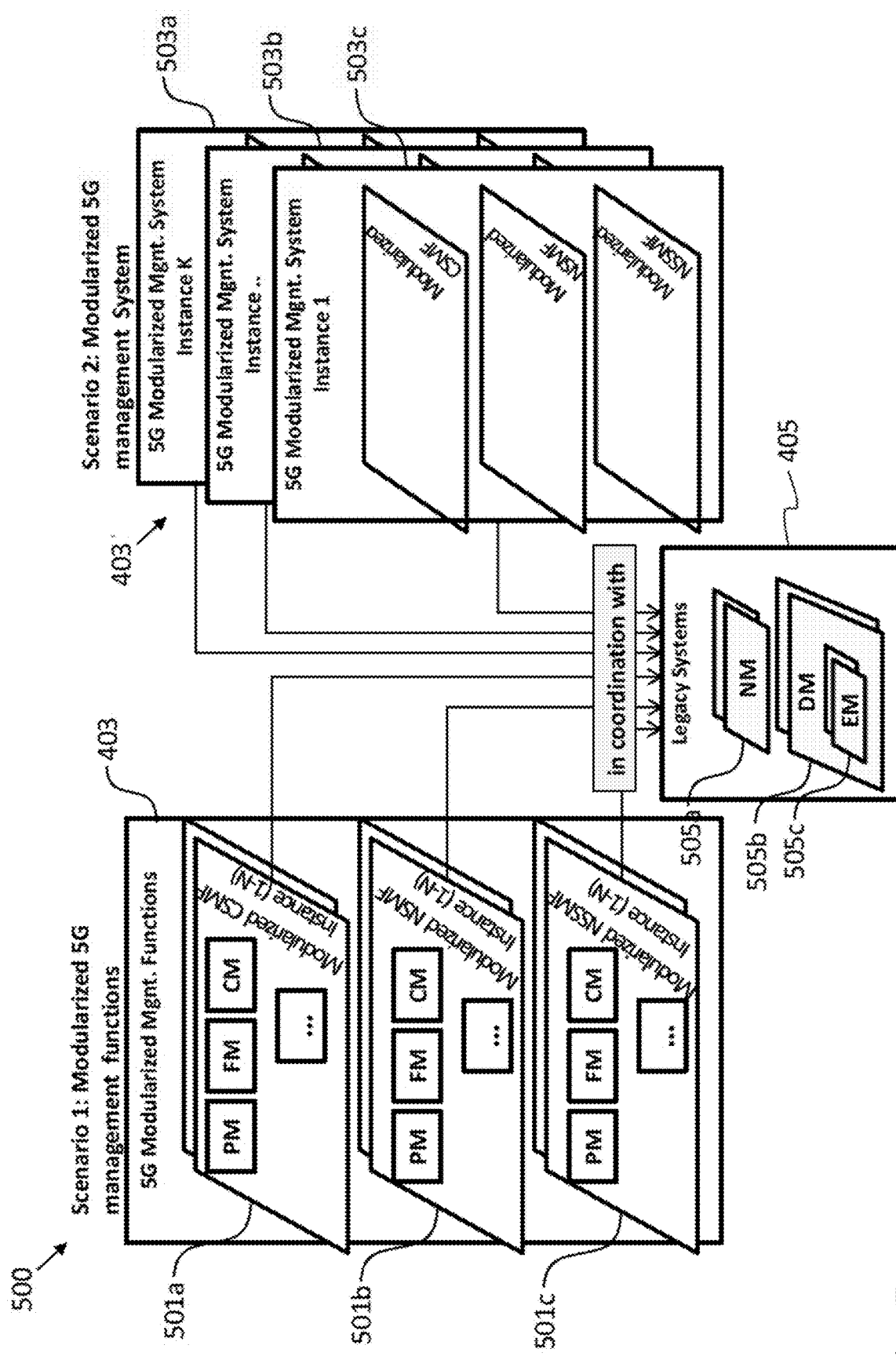
FIG. 5 shows a schematic diagram illustrating a communication network according to an embodiment which comprises a 3GPP 5G management system, a further 3GPP 5G management system and a 3GPP legacy management system.

FIG. 5 shows a schematic diagram illustrating a communication network 500 according to an embodiment which comprises a 3GPP 5G management system 403 for managing a 3GPP 5G subnetwork of the communication network 500, a further 3GPP 5G management system 403' for managing a further 3GPP 5G subnetwork of the communication network 500, and a 3GPP legacy management system 405 for managing a 3GPP legacy subnetwork of the communication network 500.

For the service-based architecture (SBA) modularization, a 3GPP 5G management system can be designed for different scenarios: modularized 5G management functions in a first scenario or modularized 5G management systems in a second scenario, as presented in FIG. 5.

As can be taken in FIG. 5, in the first scenario the 3GPP 5G management system 403 comprises a plurality of network management functions (501a-c), including one or more instances of a communication service management function (CSMF) 501a, one or more instances of a network slice management function (NSMF) 501b, and/or one or more instances of a network slice subnet management function (NSSMF) 501c.

The further 3GPP 5G management system 403' in the second scenario comprises a plurality of network management system instances (503a-c), including one or more instances of a modularized communication service management function (CSMF) 503a, one or more instances of a modularized network slice management function (NSMF) 503b, and/or one or more instances of a modularized network slice subnet management function (NSSMF) 503c.

The 3GPP legacy management system 405 is configured to manage a 3GPP legacy subnetwork of the communication network 500 and comprises a network manager (NM) 505a, a domain manager (DM) 505b and an element manager (EM) 505c.

While the SBA modularization takes place at function level in the first scenario, the second scenario is designed for modularization of the entire SG management system. In both scenarios, there exist "multiple" instances of modularized functions or systems. Each instance can be composed of multiple other functional modules. For example, a modularized CSMF instance in the first scenario can contain a performance management (PM) module, a fault management (FM) module, and a configuration management (CM) module according to the specifications 3GPP TR 28.801 v15.1.0 and 3GPP TS 28.530 v0.4.0, which enables the CSMF to be an independent and interchangeable modular function.

It is worth noting that the composed modularized management functions according to the second scenario may or may not be the same as the individual modularized management functions according to the first scenario. For instance, a performance management (PM) module, a fault management (FM) module, or a configuration management (CM) module can be designed as a separate modular function for CSMF, NSMF, and NSSMF in a modularized 5G management system instance of the further 3GPP 5G management system 403'. Additionally, each 5G modularized management function or system instance shown in FIG. 5 can be owned by either a "single" operator or "multiple" other operators.

With multiple instances of each type of management functions or systems, an important functionality according to an embodiment is coordination between the appropriate instances. Thus, the network function 401 is further configured to provide an interface between the plurality of network management function instances 501a-c of the 3GPP 5G management system 403 and/or network management system instances 503a-c of the further 3GPP 5G management system 403' and/or the plurality of network management functions (505a-c) of the 3GPP legacy management system 405.

Furthermore, another important embodiment in a modularized 3GPP 5G management system is the communication with a 3GPP legacy system. The interaction with some 3GPP legacy systems should be supported in the SBA modularization to reduce the cost for the investments. On the other hand, the communication with a 3GPP legacy system should be abstracted from a customer of communication service (e.g., an end user) as long as the requirements for the end-to-end communication service (e.g., NSaaS) are satisfied. In this scenario, the management solutions used by previous generations of mobile telecommunications technology are considered, however, in general, a 3GPP legacy system can be any technology or system used by old generations of mobile telecommunication systems. Although the embodiment covers a limited number of management functions defined by 3GPP so far, in general, any new 3GPP 5G management fractions can also be taken into account.

According to an embodiment, the network function 401 can also generate local identifiers fur the co-located network management function or system instance (501a-c; 503a-c) and the selected network management functions (501a-c; 505a-c) and/or network management system instances (503a-c) and to store the local identifiers into a local mapping database. Furthermore, the network function 401 is further configured to maintain a repository of information about the plurality of network management functions (501a-c; 505a-c) and/or network management function instances (503a-c) and to update the repository.

Figure 6:
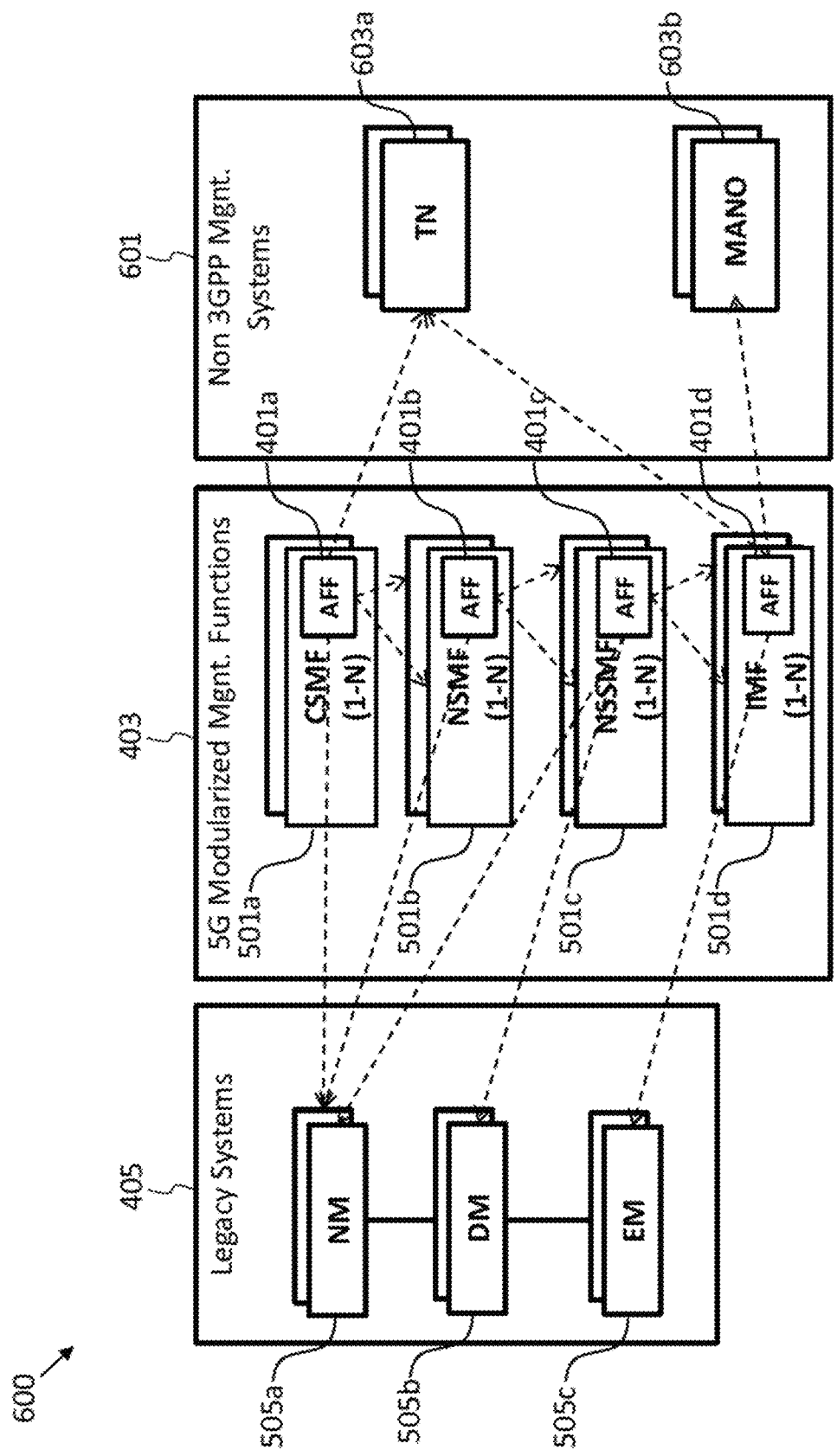
FIG. 6 shows a schematic diagram illustrating a communication network according to an embodiment which comprises a 3GPP 5G management system, a 3GPP legacy management system as well as a non-3GPP management system.

FIG. 6 shows a schematic diagram illustrating a communication network 600 according to an embodiment which comprises a 3GPP 5G management system 403 for managing a 3GPP 5G subnetwork of the communication network 600, a 3GPP legacy management system 405 for managing a 3GPP legacy subnetwork of the communication network 500 as well as a non-3GPP management system 601 for managing a non-3GPP subnetwork of the communication network 600.

According to an embodiment, a network function 401 can be designed to be a part of "any" modular management function or system instance. As can be seen in FIG. 6, a plurality of network function 401a-d can be implemented as part of one network management function of the plurality of network management functions 501a-d of the 3GPP 5G management system 403.

FIG. 6 mainly highlights that a network function 401 according to the embodiments of the disclosure can support the management functions as defined by the specifications 3GPP TR 28.801 v15.1.0 and 3GPP TS 28.530 v0.4.0 as well as legacy systems. As illustrated in FIG. 6, the network function 401 in each modularized management function can forward the requirements regarding a service request to the appropriate instance of the modular management function or legacy system. FIG. 6 illustrates example interactions between an AFF and the management functions of 3GPP 5G modularized management system and/or 3GPP legacy system and/or non-3GPP management system.

The high level functionalities of the network function 401 include selection of the appropriate instance of the modular management function/system or legacy system and forwarding the requirements to the selected appropriate instance or legacy system. Moreover, the abstraction and forwarding functionalities from the network function 401 can also support non-3GPP systems, e.g., $3^{rd}$ party Transport Network (TN) and ETSI Management and Orchestration (MANO).

According to embodiments of the disclosure, the functionalities provided by the network function 401 can be summarized as follows: selecting an appropriate instance(s) of a modularized management function or a legacy system as well as a non-3GPP system; forwarding requirements to the selected appropriate instances (modules) or legacy system; generating local identifiers for the co-located modular function instance and regional modular function instances; writing and updating mapping of local identifiers for a service request into the local mapping catalogues; modifying the updates of regional modular function instances in the associated modular function repositories; and exchanging the information of the composed modular function instance with the other modular function instances.

Selection of the appropriate modular function instance can be based on the service descriptor and the corresponding modular function repositories. When a customer requests a communication service (or network slice), the requirements of the service or slice can be defined as a service descriptor. The corresponding management function can translate the service descriptor to the required management functions. Based on this information, the network function 401 can use the associated regional modular function repositories to select an appropriate instance. The selection method can be dependent on different optimization goals. Common goals include but are not limited to load balancing, SLA (service level agreement) fulfillments, minimum latency, and etc.

An exemplary selection method with respect to the load balancing is discussed in the followings, by assuming a management function instance i of any type of management function, a set I of instances of any type of management function, the load $x_i$ of a management function instance, $i \in I$ and the management cost $f_i(x_i)$ of a instance $i \in I$, wherein $f_i(.)$ is assumed to be a convex, continuous, and non-decreasing function which will penalize the high management cost of management function instance utilization and will balance the lode across the instances. The objective function with respect to the load balancing becomes:

minimize $\Sigma f_i(x_i)$, $\forall i \in I$ subject to $x_i = \Sigma_{s \in S} |S| + \gamma_s$ $x_i \leq C_i$, wherein the load $x_i$ is defined as the number of communication services/slices $|S|$ managed by the instance i and a parameter $\gamma_s$ taken into consideration of other factors such as the locations, QoS requirements, etc. Additionally, the load of each instance should not exceed the maximum allowable capacity of $C_i$.

If required, the selection of an appropriate 3GPP legacy system can be done at the network function 401 by using the available network requirements and the corresponding repositories of the legacy systems. Generally, the management function instance Where the network function 401 is located can received such information regarding the available network requirements from another network function 401 or other 3rd party components.

Figure 7:
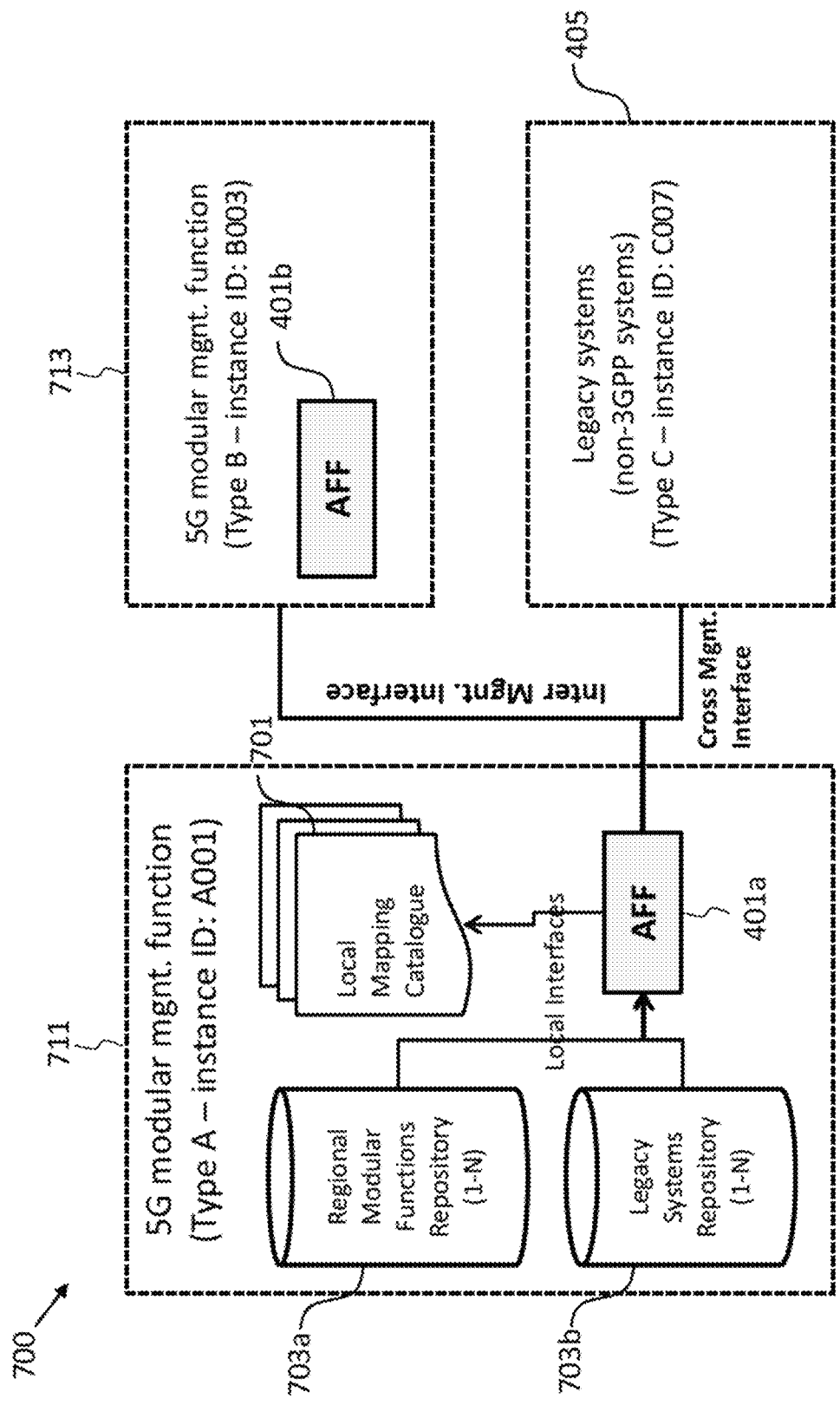
FIG. 7 shows a schematic diagram illustrating a communication network according to an embodiment which comprises a network management function, a further network management function and a 3GPP legacy management system.

FIG. 7 shows a schematic diagram illustrating a communication network 700 according to an embodiment which comprises a network management function 711, a further network management function 713 and a 3GPP legacy management system 405 for managing a 3GPP legacy subnetwork, wherein a network function 401*a-b* according to an embodiment is implemented as part of each respective network management function 711, 713.

As can be seen in FIG. 7, the network management function 711 further comprises a local mapping database i.e. a local mapping catalogue 701, a regional modular function repository 703*a*, and a legacy system repository 703*b*.

The repositories 703*a-b* can store information about the nearby modular functions and/or function instances and legacy systems which usually are a candidate functions/legacy system of the modular function instance wherein the network function 401*a-b* resides. The network function 401*a-b* can work with multiple repositories for the selection of the appropriate instances. Different repositories may require different information to be stored For example, the type of information stored in the regional modular functions repository 703*a* may include the name of modular function instance (e.g., CSMF, NSMF), the local identifier, the geographical location of the instance, the load information of the instance, and the required parameters of the instance for communication, etc.

Furthermore, the local mapping database 701, i.e., local mapping catalogue according to an embodiment can store the wrapping of the communication service/slice to the appropriate management inaction pairs or legacy systems. The mapping information is important to support other modules within the management function instance. Other modules within the instance where the network function 401*a-b* resides can use the mapping information to communicate with the corresponding modules of the selected instance. For instance, the PM module of the modularized CSMF instance needs to communicate with the PM module of the selected modularized MILE instance for end-to-end network slice management. In the case of communication service termination, the mapping information can be used to send a request to the correct management function instance(s). Moreover, the load of the regional instances can be estimated using the mapping information, etc.

As shown in FIG. 7, a cross management Interface is an interface between a 3GPP 5G modularized management function instance 711, 713 and the legacy management system 405. The interface is used to forward the network related requests/requirements of the 3GPP legacy management system 405, e.g., network requirements and exchange other information/parameters between the 5G modularized management function instances 711, 713 and the 3GPP legacy system 405. The cross management Interface can also be applied to a non-3GPP management system.

Moreover, an inter management Interface is an interface between the 5G modularized management functions 711, 713. The interface is used to forward the network related request/requirements and exchange the information between 5G modularized management functions 711, 713. A local Interface is an interface between the network function 401*a* and its repositories 703*a-b* as well as its local mapping database (i.e. catalogue) 701 to fetch, query, and update information.

Figure 8:
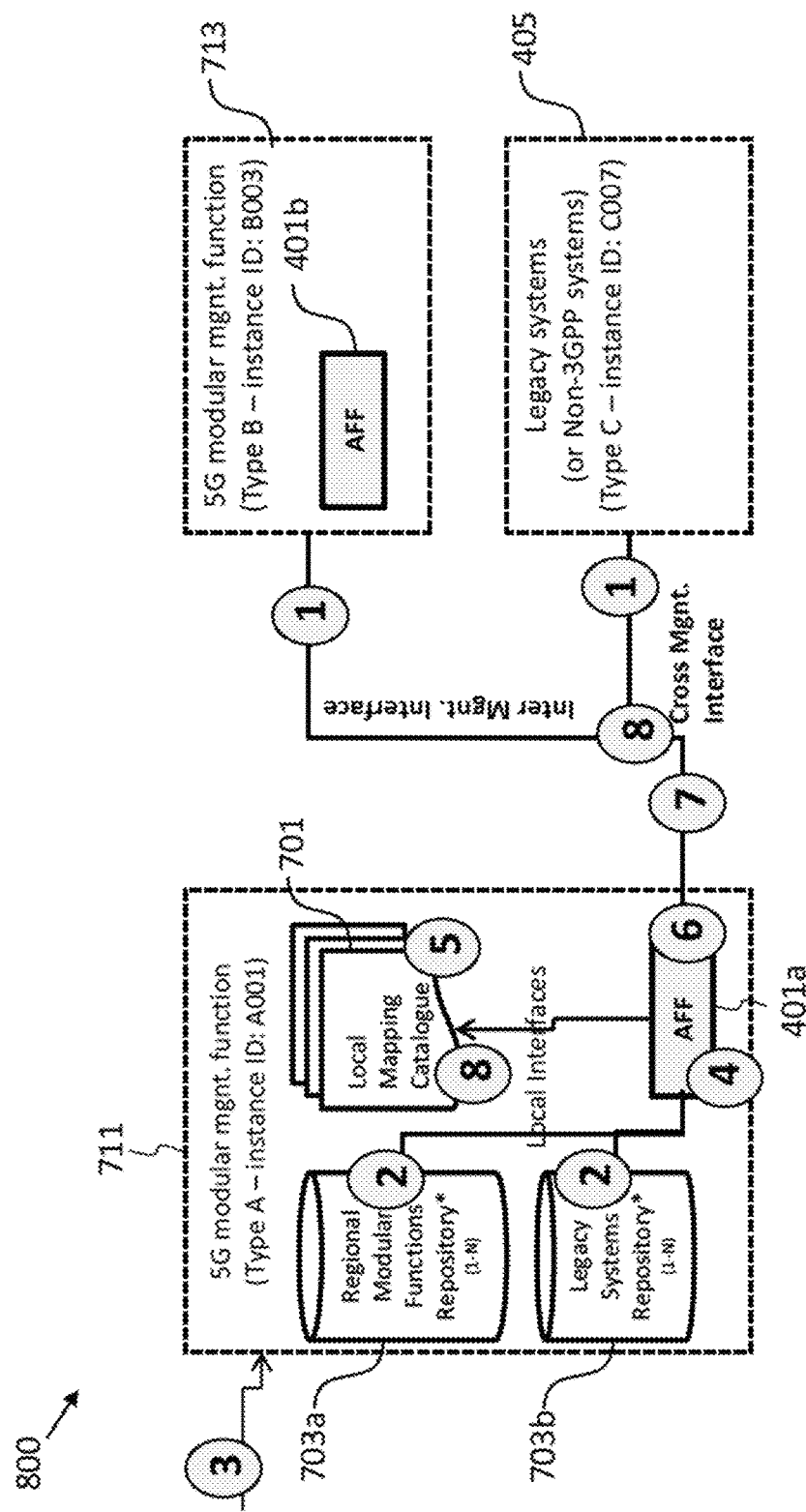
FIG. 8 shows a schematic diagram illustrating a communication network according to an embodiment which comprises a network management function, a further network management function and a 3GPP legacy management system and an exemplary procedure for coordination in the communication network.

Similarly to FIG. 7, FIG. 8 shows a schematic diagram illustrating a communication network 800 according to an embodiment which comprises a 5G network management function 711, a further 5G network management function 713 and a 3GPP legacy management system 405 for managing a 3GPP legacy subnetwork, wherein a network function 401*a-b* according to an embodiment is implemented as part of each respective network management function 711, 713 and wherein the network management function 711 further comprises a local mapping database i.e. a local mapping catalogue 701, a regional modular function repository 703*a*, and a legacy, system repository 703*b*.

A possible procedure as shown in FIG. 8 for the network function 401*a* to coordinate between the network management function 711 and the further network management function 713 as well as between the network management function 711 and the 3GPP legacy management system 405 comprises the following steps:

Step 1: The network function 401*a* of the 5G modular management function 711 exchanges the information with the 5G network management function 713 and the 3GPP legacy management system 405. The information includes but is not limited to instance ID, type, geographic location, load information, the required parameters of the instance for communication, etc. The information is exchanged via the corresponding interfaces, i.e. the inter management interface and the cross management interface in every interval of a "t" unit. The network function 401*a* can exchange the information with dedicated management function instances based on the repository of their geographical locations or can be broadcast to all the regional management function instances in close proximity to it.

Step 2: The acquired information is updated to the corresponding, repositories 703*a-b*.

Step 3: The 5G modular management function 711 receives network requirements of a communication service/network slice either from another network function or other components. Step 4: The network function 401*a* of the 5G modular management function 711 can use the received network requirements. Then, the network function 401*a* executes an appropriate instance (e.g., Type B with ID-B003) or the 3GPP legacy management system 405 (e.g., Type C with ID-0007) as shown in FIG. 8. The selection process is based on the "desired objective function" (e.g., load balancing as already discussed above). For the selection process, the information about the type of management function can be retrieved from the received network requirements from Step 3. For the selection method, the information about the instance's location, load or etc. will be retrieved from repositories and execute the selection of the appropriate instance.

Step 5: After selection of the appropriate instance has completed, the next step is to update the mapping information of service (e.g., NSSI(s) of the NSI) and the selected instance into the local mapping database (i.e. catalogue) 701. The mapping information is important to support other modules within the management function instance. Moreover, the mapping information can support the estimation of the regional management instances.

Step 6: Before the actual forwarding to the selected instance, the network function 401*a* prepares the information needed to be sent and collects the interface information of the selected instance from the corresponding repository 70*a-b*.

Step 7: The network function 401*a* forwards the network related requirements via the corresponding interface. For example, the network requirements for the selected instance are sent via the inter management interface if the selected instance is 5G modular management function 713. Otherwise, the information is forwarded through the cross management interface.

Step 8: The network function 401 receives the response from the selected instance via the corresponding interface. Upon receiving the response, the network function 401 updates the local mapping database (i.e., catalogue) 701. For example, the actual identifier of the managed entity (e.g., NSSI) managed by the selected instance (e.g., NSSMF) can be included in the response and is updated to the local mapping database.

Figure 9:
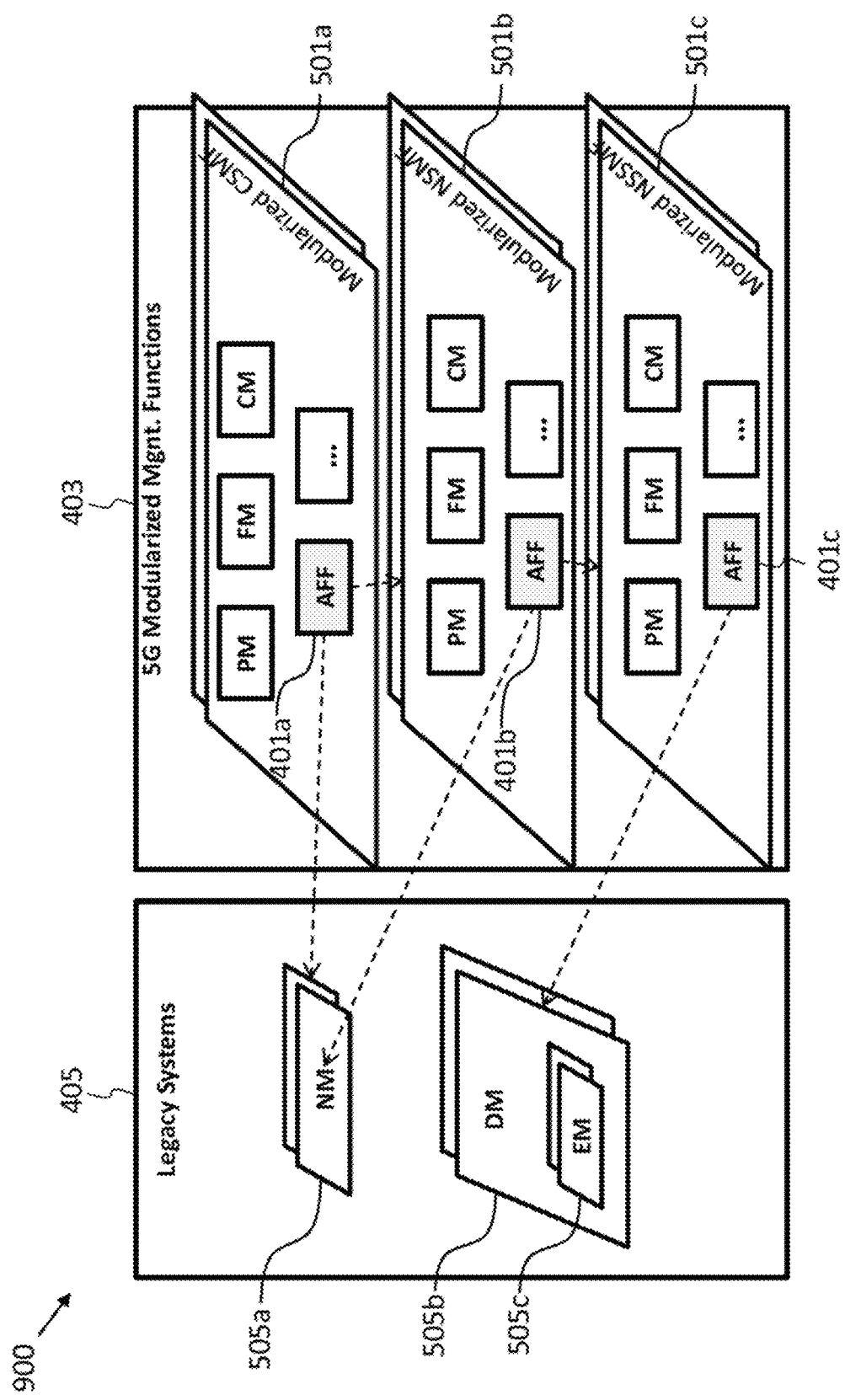
FIG. 9 shows a schematic diagram illustrating a communication network according to an embodiment which comprises a 3GPP 5G management system whose modularization is designed at the management function level and a 3GPP legacy management system.

FIG. 9 shows a schematic diagram illustrating a communication network 900 according to an embodiment which comprises a 3GPP 5G management system 403 and a 3GPP legacy management system 405. In the 3GPP 5G management system 403, the modularization is designed at the management function level. In particular, the modularized CSMF 501*a*, NSMF 501*b*, and NSSMF 501*c* are designed with other functional modules such as PM, FM, and CM which makes the modularized CSMF 501*a*, NSMF 501*b*, or NSSMF 501*c* to become the independent 5G modular management functions. In the SBA modularization, there is no central management function and each type of modularized management functions can be distributed across different geographical locations. For each instance of the 5G modularized management functions, the AFF 401*a-c* is designed to support the selection of the appropriate management function instance not only for the other 5G modularized management function instance but also the appropriate Legacy system 405. The communication between the type of modularized management functions and/or the communication between a modularized management function and a 3GPP Legacy system can be dependent on the requirements described in the communication service with and/or without network slices.

Figure 10:
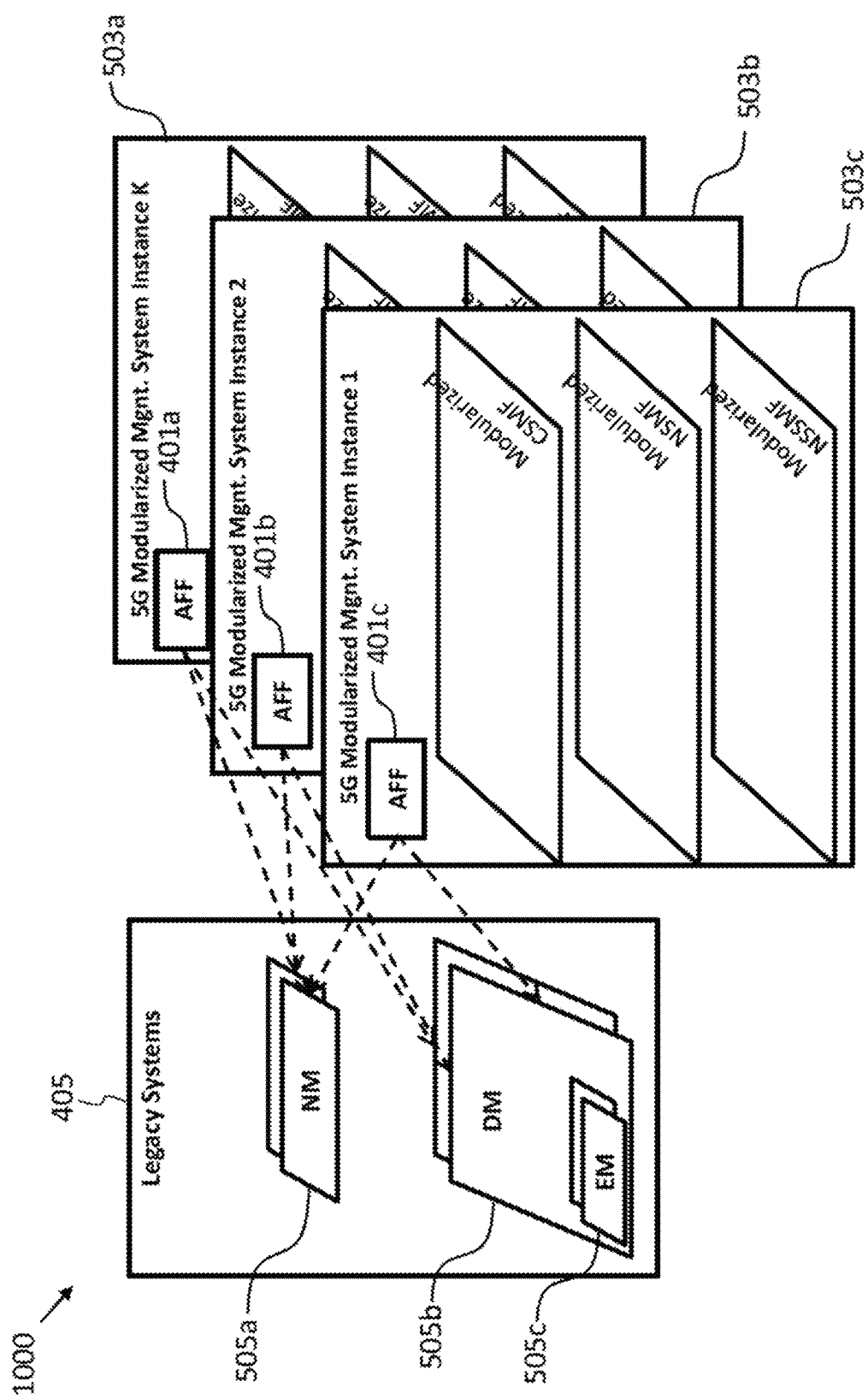
FIG. 10 shows a schematic diagram illustrating a communication network according to an embodiment which comprises a 3GPP 5G management system whose modularization is designed at the management system level and a 3GPP legacy management system.

FIG. 10 shows a schematic diagram illustrating a communication network 1000 according to a further embodiment which comprises several instances of a 3GPP 5G management system 503*a-c* and a 3GPP legacy management system 405. In this embodiment, the modularization is considered at the entire management system in the 3GPP management system. In this embodiment, the AFFs 401*a-c* fulfills the same role of abstraction and forwarding features between the 5G modular management system instances 503*a-c* and the legacy system 405.

The AFFs 401*a-c* are designed to work with each modular instance. The modular instance can be a management function, a set of management functions, or a management system. A single AFF 401 may be sufficient to serve the management system instance to perform abstraction and forwarding functionalities. By using the necessary information from the requirements, the AFF 401*a-c* is configured to select the appropriate instance or Legacy system and forwards the requirements to the selected instance or system. The forwarding to the appropriate instance is an important feature of the AFF 401*a-c* which can achieve the desired goals of the end-to-end communication service (as well as network slicing) management. The abstraction features of the AFF 401*a-c* enables the 5G modular management system to reuse and communicate with the existing Legacy systems without changing the QoS and the requirements of the customer's request on the communication service with and/or without network slicing. By enabling reusability of some parts of 3GPP Legacy systems, the abstraction feature of the AFF 401*a-c* allows the telecommunication providers to reduce the cost (i.e., CAPEX) for the investments of upgrading to the 5th Generation mobile technologies.

Figure 11:
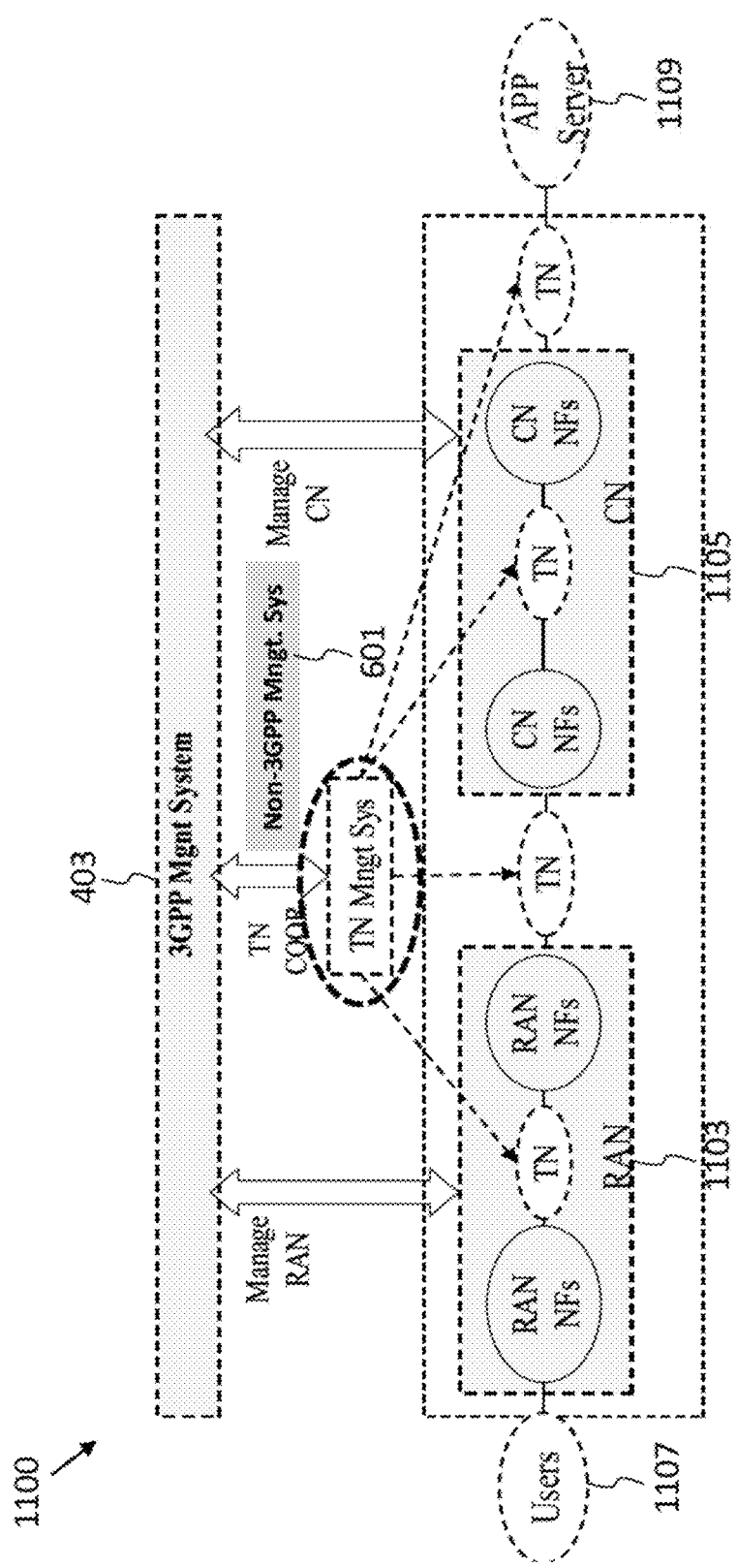
FIG. 11 shows a schematic diagram illustrating a communication network which comprises a 3GPP 5G management system and a non-3GPP management system.

Both of the above scenarios highlight the abstraction and forwarding features (i.e., the interaction with different modular instance and with 3GPP Legacy systems) of the AFFs 401*a-c*. Furthermore, the AFF 401*a-c* of an instance of the same modular management function can exchange the information between each other to support a synchronization of the entire management system if needed. Additionally, the AFF can support a non-3GPP management system as well, as illustrated in FIG. 11, which shows a schematic diagram illustrating a communication network 1100 according to an embodiment which comprises a 3GPP 5G management system 403 and a non-3GPP management system 601. More details about the coordination between a 3GPP management system and a non-3GPP management system can be found in 3GPP TS 28.530 v0.4.0, "Management of network slicing in mobile networks: Concepts, use cases and requirements".

To fulfil the requirements of the communication service customer, the 3GPP management system has to coordinate with the corresponding management entities of the non-3GPP parts (e.g., TN, MANO system) as, for example, when preparing a network slice instance for the communication service. The coordination may include exchanging capabilities of the non-3GPP parts or service/slice requirements, the required parameters for communication, etc.

Figure 12:
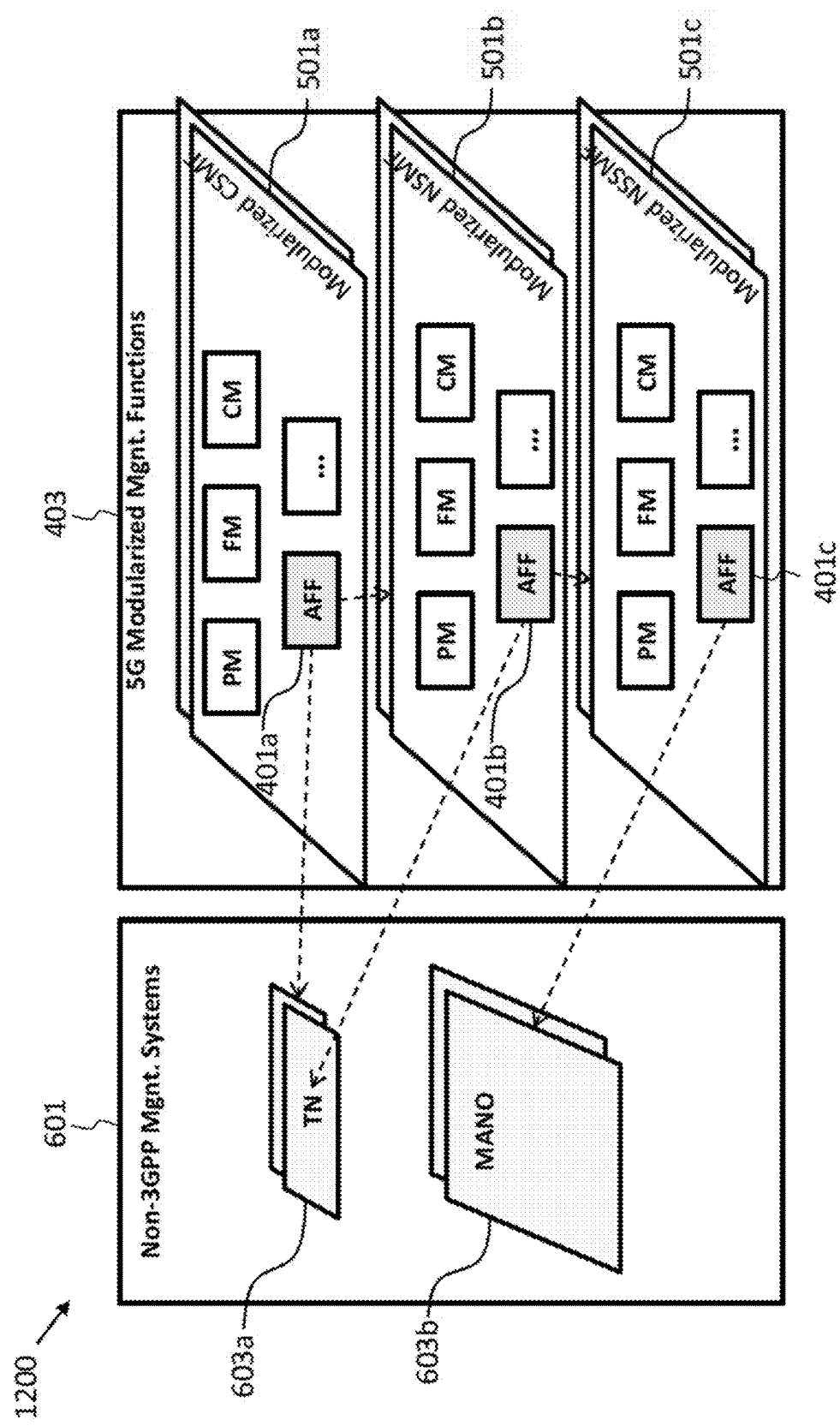
FIG. 12 shows a schematic diagram illustrating a communication network according to an embodiment which comprises a 3GPP 5G management system whose modularization is designed at the management function level and a non-3GPP management system.
Figure 13:
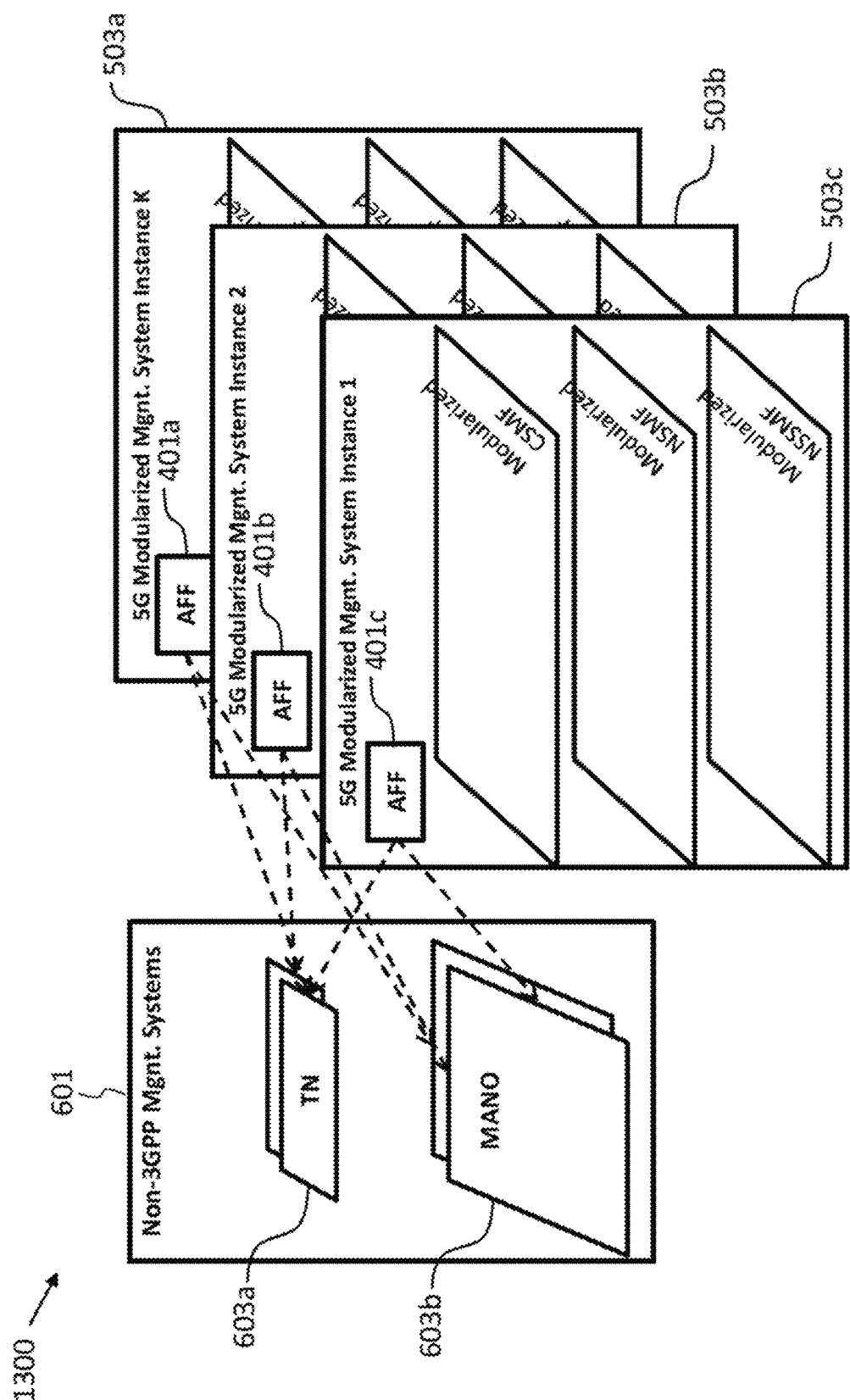
FIG. 13 shows a schematic diagram illustrating a communication network according to an embodiment which comprises a 3GPP 5G management system whose modularization is designed at the management system level and a non-3GPP management system.

Considering such a scenario for an NSaaS, the example interaction of the AFF 401*a-c* with a TN management system and a MANO management system are illustrated for both scenarios in FIGS. 12 and 13. Any combinations of the 5G modular functions/systems and non-3GPP management systems can be provided by the AFT 401*a-c*.

The modularized management functions or systems can be owned or managed by a single or multiple other operators. In this case, the AFF 401*a-c* can interact with a delegation component which delegates the incoming request from customer or other operator to the appropriate management functions amongst 5G management functions.

Embodiments of the disclosure provide in particular for the following advantages: reducing CAPEX via use of Legacy systems in a 5G system; abstraction as the use of legacy systems can be hidden from external customers by using the AFFs 401a-c; modularization as the independent and interchangeable modularized AFF 401a-c executes the selection of the appropriate instance (either 5G modularized management function or Legacy system) and forwards the requirements to the selected instance; scalability as at any layer of the 5G modularized management function (i.e., service, slice, subnet infrastructure), the AFF 401a-c can be executed locally; self-management as the AFF 401a-c (of the 5G modularized management function) organizes with each other for information exchange/update and independently works with local decision; local optimization as the AFF 401a-c independently decides the selection of appropriate instance(s) with respect to the desired optimization goals, e.g., load balancing, SLA fulfillment, and the like.

Figure 14:
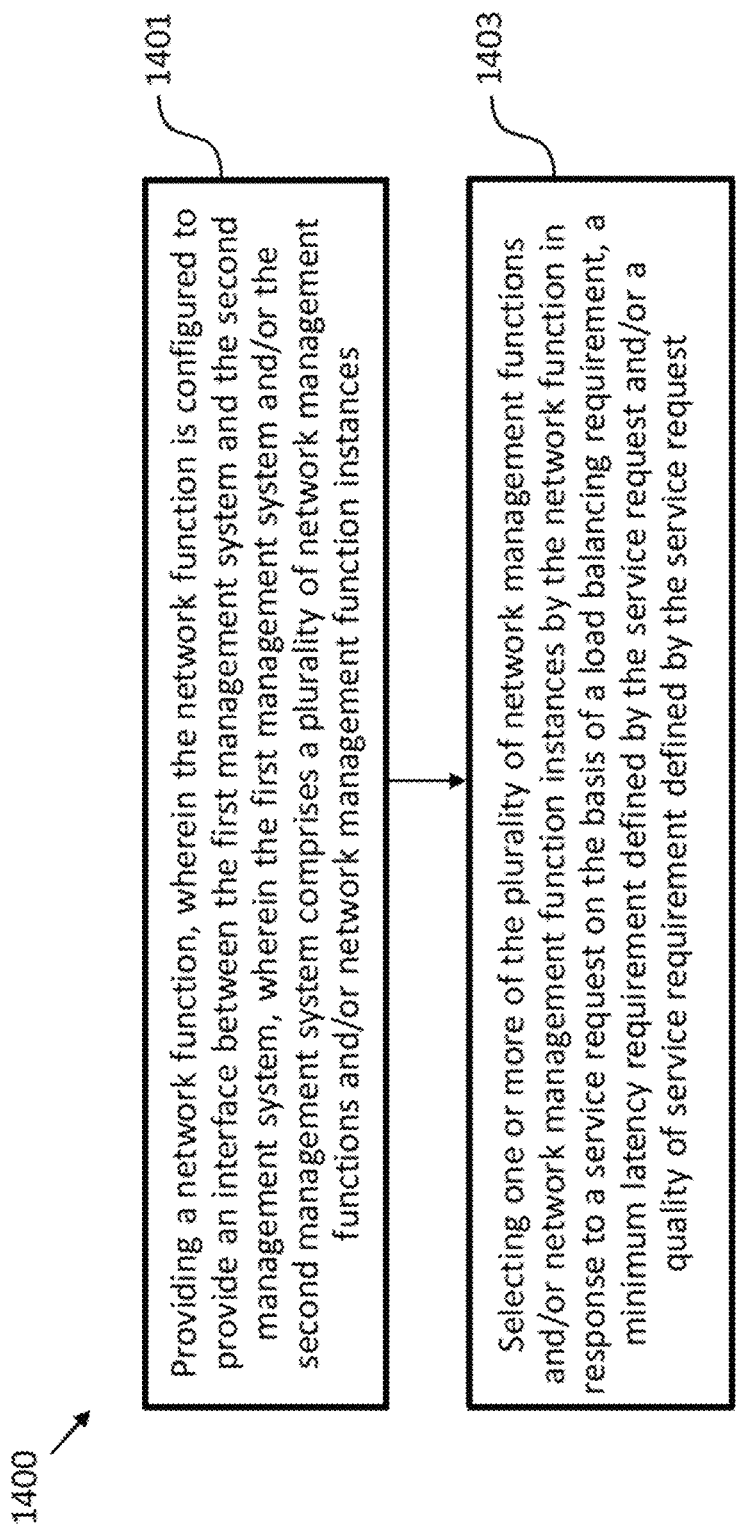
FIG. 14 shows a schematic diagram illustrating a method of operating a network entity for a communication network according to an embodiment.

FIG. 14 shows a schematic diagram illustrating a method 1400 for supporting end-to-end communication services in a communication network 400, including communication services with network slices and communication services without network slices, wherein the communication network 400 comprises a first management system 403 for managing a 3GPP 5G subnetwork of the communication network 400 and a second management system 405, 601 for managing a 3GPP legacy subnetwork and/or a non-3GPP subnetwork of the communication network 400.

The method 1400 comprises a step 1401 of providing a network function 401, wherein the network function 401 is configured to provide an interface between the first management system 403 and the second management system 405, 601, wherein the first management system 403 and of the second management system 405, 601 comprises a plurality of network management functions 501a-c, 505a-c, 603a-b and/or network management function instances 503a-c.

The method 1400 comprises a further step 1403 of selecting one or more of the plurality of network management functions 501a-c, 505a-c, 603a-b and/or network management function instances 503a-c by the network function 401 in response to a service request on the basis of a load balancing requirement, a minimum latency requirement defined by the service request and/or a quality of service requirement defined by the service request.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless Whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

The invention claimed is:

1. A method for providing a network function supporting end-to-end communication services with network slices and communication services without network slices in a communication network, the communication network comprising a first management system managing a 3GPP 5G subnetwork of the communication network and a second management system managing a 3GPP legacy subnetwork and/or a non-3GPP subnetwork of the communication network, the method comprising the steps of:

providing an interface between the first management system and the second management system, wherein the first management system and/or the second management system comprises a plurality of network management functions and/or network management function instances; and selecting one or more of the plurality of network management functions and/or network management function instances in response to a service request based on a load balancing requirement, a minimum latency requirement defined by the service request and/or a quality of a service requirement defined by the service request, wherein the first management system includes one or more instances of a communication service management function, one or more instances of a network slice management function (NSMF), and/or one or more instances of a network slice subnet management function (NSSMF), or at least one of the network management function instances of the first management system comprises one or more instances of a modular communication service management function (CSMF), one or more instances of a modular network slice management function (NSMF), and/or one of a modular network slice subnet management function (NSSMF) or multiple instances, and wherein the 3GPP legacy subnetwork of the communication network managed by the second management system comprises a network manager (NM), a domain manager (DM), and an element manager (EM).

2. The method according to claim 1, further comprising providing an interface between the plurality of network management functions and/or network management function instances of the first management system and/or between the plurality of network management functions and/or network management function instances of the second management system.

3. The method according to claim 1, further comprising forwarding the service request and/or the service requirement defined by the service request to the selected network management functions and/or network management function instances.

4. The method according to claim 1, further comprising generating at least one local identifier for one network management function and/or network management function instance and the selected network management functions and/or network management function instances, the local identifier being used to store a mapping of management function instances into a local mapping database.

5. The method according to claim 1, further comprising:
maintaining a repository of information about the plurality of network management functions and/or network management function instances; and
updating the repository upon receiving the service request from other network management functions and/or network management function instances.

6. A communication network for providing end-to-end communication services, including communication services with network slices and communication services without network slices, the communication network comprising:
a first management system for managing a 3GPP 5G subnetwork of the communication network;
a second management system for managing a 3GPP legacy subnetwork and/or a non-3GPP subnetwork of the communication network; and
at least one network function supporting the end-to-end communication services, the network function being configured to:
provide an interface between the first management system and the second management system, wherein the first management system and/or the second management system comprises a plurality of network management functions and/or network management function instances; and
select one or more of the plurality of network management functions and/or network management function instances in response to a service request based on a load balancing requirement, a minimum latency requirement defined by the service request and/or a quality of a service requirement defined by the service request,
wherein the first management system includes one or more instances of a communication service management function, one or more instances of a network slice management function (NSMF), and/or one or more instances of a network slice subnet management function (NSSMF), or at least one of the network management function instances of the first management system comprises one or more instances of a modular communication service management function (CSMF), one or more instances of a modular network slice management function (NSMF), and/or one of a modular network slice subnet management function (NSSMF) or multiple instances, and
wherein the 3GPP legacy subnetwork of the communication network managed by the second management system comprises a network manager (NM), a domain manager (DM), and an element manager (EM).

7. The communication network of claim 6, wherein the first management system comprises a plurality of network management functions and/or network management function instances, including one or more instances of a communication service management function (CSMF), one or more instances of a network slice management function (NSMF), and/or one or more instances of a network slice subnet management function (NSSMF).

8. The communication network of claim 7, wherein the network function is configured as part of one network management function and/or network management function instance of the plurality of network management functions and/or network management function instances of the first management system.

9. The communication network of claim 8, wherein the one network management function and/or network management function instance comprises a local mapping database for storing local identifiers for the one network management function and/or network management function instance and the selected network management functions and/or network management function instances generated by the network function together with the identifiers of the managed entities.

10. The communication network of claim 8, wherein the one network management function and/or network management function instance comprises a repository of information about the plurality of network management functions and/or network management function instances.

11. The communication network of claim 6, wherein the communication network comprises a plurality of instances of the first management system.

12. A non-transitory computer readable medium storing program code executing on a computer to cause the computer to perform a network function supporting end-to-end communication services in a communication network, the communication services including communication services with network slices and communication services without network slices, the communication network comprising a first management system for managing a 3GPP 5G subnetwork of the communication network and a second management system for managing a 3GPP legacy subnetwork and/or a non-3GPP subnetwork of the communication network, the network function comprising:
providing an interface between the first management system and the second management system, wherein the first management system and/or the second management system comprises a plurality of network management functions and/or network management function instances; and
selecting one or more of the plurality of network management functions and/or network management function instances by the network function in response to a service request based on a load balancing requirement, a minimum latency requirement defined by the service request and/or a quality of a service requirement defined by the service request,
wherein the first management system includes one or more instances of a communication service management function, one or more instances of a network slice management function (NSMF), and/or one or more instances of a network slice subnet management function (NSSMF), or at least one of the network management function instances of the first management system comprises one or more instances of a modular communication service management function (CSMF), one or more instances of a modular network slice management function (NSMF), and/or one of a modular network slice subnet management function (NSSMF) or multiple instances, and wherein the 3GPP legacy subnetwork of the communication network managed by the second management system comprises a network manager (NM), a domain manager (DM), and an element manager (EM).

13. The non-transitory computer readable medium according to claim 12, wherein the network function further comprises providing an interface between the plurality of network management functions and/or network management function instances of the first management system and/or between the plurality of network management functions and/or network management function instances of the second management system.

14. The non-transitory computer readable medium according to claim 12, wherein the network function further comprises forwarding the service requirements and/or request to the selected network management functions and/or network management function instances.

15. The non-transitory computer readable medium according to claim 12, wherein the network function further comprises generating at least one local identifier for one network management function and/or network management function instance and the selected network management functions and/or network management function instances, the local identifier being used to store the mapping of management function instances into a local mapping database.

16. The non-transitory computer readable medium according to claim 12, wherein the network function further comprises maintaining a repository of information about the plurality of network management functions and/or network management function instances and updating the repository upon receiving the request from other network management functions and/or network management function instances.

* * * * *